US012122378B2

(12) United States Patent
Kienitz et al.

(10) Patent No.: US 12,122,378 B2
(45) Date of Patent: Oct. 22, 2024

(54) METHOD AND DEVICE FOR DETECTING A TRAFFIC LAW VIOLATION DUE TO THE ALLOWABLE DISTANCE BETWEEN A FOLLOWING VEHICLE AND A GUIDE VEHICLE BEING UNDERSHOT

(71) Applicant: JENOPTIK Robot GmbH, Monheim am Rhein (DE)

(72) Inventors: Stefan Kienitz, Duisburg (DE); Einar Maag, Solingen (DE); Gregor Skrzeczynski, Duesseldorf (DE); Siegrun Reis, Solingen (DE); Michael Lehning, Hildesheim (DE)

(73) Assignee: Jenoptik Robot GmbH, Monheim am Rhein (DE)

( * ) Notice: Subject to any disclaimer, the term of this patent is extended or adjusted under 35 U.S.C. 154(b) by 517 days.

(21) Appl. No.: 17/441,151

(22) PCT Filed: Mar. 5, 2020

(86) PCT No.: PCT/EP2020/055828
§ 371 (c)(1),
(2) Date: Sep. 20, 2021

(87) PCT Pub. No.: WO2020/187581
PCT Pub. Date: Sep. 24, 2020

(65) Prior Publication Data
US 2022/0161798 A1 May 26, 2022

(30) Foreign Application Priority Data
Mar. 21, 2019 (DE) ...................... 10 2019 107 279.4

(51) Int. Cl.
*B60W 30/16* (2020.01)
*G08G 1/01* (2006.01)
(Continued)

(52) U.S. Cl.
CPC ......... *B60W 30/162* (2013.01); *G08G 1/0112* (2013.01); *G08G 1/0125* (2013.01);
(Continued)

(58) Field of Classification Search
None
See application file for complete search history.

(56) References Cited

U.S. PATENT DOCUMENTS 5,066,950 A * 11/1991 Schweitzer .............. G08G 1/04
340/936
8,433,510 B2 * 4/2013 Bradai ................... G01C 21/26
382/316

(Continued)

FOREIGN PATENT DOCUMENTS

| AU | 2016202050 A1 | 11/2016 | |
|---|---|---|---|
| EP | 1099960 A1 * | 5/2001 | ........... G01S 13/867 |
| EP | 3082119 A1 * | 10/2016 | .............. G01S 11/12 |

OTHER PUBLICATIONS

Google translation of EP 3082119, Available Online https://patents.google.com/patent/EP3082119A1/en?oq=EP+3082119, accessed on Mar. 13, 2024, Published 2016 (Year: 2016).*

(Continued)

*Primary Examiner* — Tahmina N Ansari
(74) *Attorney, Agent, or Firm* — Muncy, Geissler, Olds & Lowe, P.C.

(57) ABSTRACT

A method for detecting a traffic law violation due to the allowable distance between a following vehicle and a guide vehicle being undershot, the following vehicle traveling behind the guide vehicle. At least the respective speed of the following vehicle is identified and the guide vehicle in a detection region in the surroundings of a sensor which supplies speed measurement values. A reference distance is detected and/or ascertained between the following vehicle and the guide vehicle at a reference measurement point. At (Continued)

least one following distance is determined between the following vehicle and the guide vehicle in the detection region using the identified speeds of the following vehicle and the guide vehicle and/or the detected reference distance. A traffic law violation is detected if the following distance in the detection region continuously falls short of a distance threshold.

15 Claims, 2 Drawing Sheets

(51) Int. Cl.
G08G 1/015 (2006.01)
G08G 1/04 (2006.01)
G08G 1/054 (2006.01)

(52) U.S. Cl.
CPC .............. *G08G 1/015* (2013.01); *G08G 1/04* (2013.01); *G08G 1/054* (2013.01); *B60W 2420/403* (2013.01); *B60W 2420/408* (2024.01); *B60W 2555/60* (2020.02)

(56) References Cited

U.S. PATENT DOCUMENTS

| | | | | |
|---|---|---|---|---|
| 8,457,359 | B2 * | 6/2013 | Strauss | G01S 13/931 382/104 |
| 2008/0062009 | A1 * | 3/2008 | Marton | G08G 1/0175 340/937 |
| 2011/0044507 | A1 * | 2/2011 | Strauss | B60W 40/04 382/103 |
| 2022/0161798 | A1 * | 5/2022 | Kienitz | G08G 1/0112 |

OTHER PUBLICATIONS

Google translation of EP1099960A1, Available online: https://patents.google.com/patent/EP1099960A1/en?oq=EP+1099960+A1, accessed on Mar. 13, 2024, Published 2003 (Year: 2003).*

* cited by examiner

METHOD AND DEVICE FOR DETECTING A TRAFFIC LAW VIOLATION DUE TO THE ALLOWABLE DISTANCE BETWEEN A FOLLOWING VEHICLE AND A GUIDE VEHICLE BEING UNDERSHOT

This nonprovisional application is a National Stage of International Application No. PCT/EP2020/055828, which was filed on Mar. 5, 2020, and which claims priority to German Patent Application No. 10 2019 107 279.4, which was filed in Germany on Mar. 21, 2019, and which are both herein incorporated by reference.

BACKGROUND OF THE INVENTION

Field of the Invention

The present invention relates to a method and a device for detecting a traffic law violation due to an allowable distance between a following vehicle and a guide vehicle being undershot.

Description of the Background Art

Excessive speed is known to be a major problem in enforcing traffic safety legislation. However, an even higher percentage of accidents on freeways and expressways can be attributed to insufficient distance from the vehicle ahead. With regard to distance checking when high speeds are involved, road traffic regulations in European countries (the Netherlands, Germany, and Austria) and in the USA have different legal positions and measuring methods derived therefrom for prosecuting violations. The usual measuring methods differ depending on the sensor system used, the viewing angle of the sensor system, and the type of installation/application. As a rule, a point measurement has no probative strength; misconduct should be measured over a longer distance and be documented so as to stand up in court.

In addition, different regulations for cars than for buses and trucks over 3.5 t exist, for example in Germany. Section 4 (3) of the StVO [Road Traffic Act] stipulates that trucks over 3.5 t and buses traveling faster than 50 km/h on freeways must observe a minimum distance of 50 m. Collectively, these regional and application-related regulations mean that automatic measuring operation does not exist at present, or exists only in rudimentary form, without supervision by a measuring officer ("unattended measuring operation").

In the case of distance-related offenses in road traffic, automated measurement, documentation, and ticket issuance that will stand up in court and to expert opinions therefore additionally require proof with a driver's photo, even in countries with driver liability. There is a legal requirement to provide proof of distance violation over at least 250 m travel distance. A point measurement by means of radar/camera is not suitable for this purpose, or only suitable with limitations.

For example, bridge-based measuring methods can be used, wherein the use of such methods requires the presence of a measuring officer (attended measuring operation) as well as the manual selection/evaluation of a measurement on site and in the back office. The measuring system requires markings on the roadway so that this type of distance measurement can only be implemented in road sections designated for this purpose.

SUMMARY OF THE INVENTION

Against this background, with the approach presented here, a method and a device for detecting a traffic law violation due to an allowable distance between a following vehicle and a guide vehicle being undershot are presented according to the main claims. Advantageous variants of the approach presented here result from the dependent claims.

A method is presented here for detecting a traffic law violation due to an allowable distance between a following vehicle and a guide vehicle being undershot, wherein the following vehicle travels behind the guide vehicle and wherein the method has the following steps:

a. identifying at least one respective speed of the following vehicle and of the guide vehicle in a detection region in the surroundings of a sensor supplying speed measurement values, wherein measurement values for identifying the speed of the following vehicle and of the guide vehicle are in particular captured simultaneously in the detection region;

b. capturing and/or ascertaining a reference distance between the following vehicle and the guide vehicle at a reference measurement point;

c. deducing at least one following distance between the following vehicle and the guide vehicle in the detection region by using the identified speeds of the following vehicle and of the guide vehicle and/or by using the captured reference distance; and d. detecting the traffic law violation if at least the following distance in the detection region continuously falls short of a distance threshold.

A detection region can be understood to mean a region outside the sensor supplying speed measurement values, within which region the speeds of the vehicles are captured. A following vehicle can be understood to mean a vehicle that follows a guide vehicle, i.e., travels behind the guide vehicle.

The approach proposed here is based on the knowledge that by evaluating the identified speeds of the following vehicle and of the guide vehicle as well as the reference distance between the following vehicle and the guide vehicle, conclusions can be drawn about the distance between the following vehicle and the guide vehicle even while the following vehicle and the guide vehicle are passing through the detection region. This takes advantage of the fact that physically different measuring methods can often capture speeds better than distances, especially when these distances between objects are to be captured at very great distances from a measuring sensor and when for this purpose, high tolerances sometimes have to be taken into account that stand in the way of using the measurement results in a precise manner that will stand up in court. For this purpose, for example, a differential speed between the speeds of the following vehicle and of the guide vehicle can be ascertained, which then allows a very precise deduction of the distance relationships between the following vehicle and the guide vehicle within the detection region if the reference distance at the reference point is known. In this way, different measuring methods can be combined in order to obtain the advantages of the measuring methods for ascertaining very precise distances between the following vehicle and the guide vehicle, in order to then obtain a determination of the following distance between the following vehicle and the guide vehicle that will stand up in court and to expert opinions. It is then possible to document the traffic law violation very precisely and in a manner that will stand up in court. Furthermore, this approach can advantageously be used at virtually any position in a road traffic situation. It is therefore no longer necessary to prepare specific locations for the implementation of a distance measurement between two vehicles, such as applying lines to a roadway, with the result that monitoring an undershooting of the allowable distance between two vehicles can be deployed much more flexibly with the approach presented here. Furthermore, the automated ascertainment of the distance also means that the often required presence of a measuring officer can be dispensed with so that personnel expenditures for monitoring undershooting of the allowable distance or the traffic law violation to be detected here can be minimized.

An embodiment of the approach presented here is advantageous, in which in the step of identifying the speed of the following vehicle and of the guide vehicle in the detection region, the determination of the following distance takes place by using the measurement values of a speed-detection sensor, in particular, of a radar sensor and/or a LIDAR sensor, and/or directly from reading speed-relevant data transmitted by the vehicle and/or by using images from the image sequence. Especially, the identification of the speeds by using measurement values from a radar sensor and/or a LIDAR sensor advantageously enables the use of measurement values from highly precise sensor technology, which then also enables a very reliable and precise determination of the following distance or of following distances between the following vehicle and the guide vehicle.

According to a further embodiment of the approach presented here, the absolute speed of the following vehicle and of the guide vehicle in the detection region can also be ascertained in the step of identifying. In the present case, an absolute speed can be understood to mean a speed of the following vehicle and of the guide vehicle over the ground. In addition to a sensor-based measurement, the speeds can also be ascertained from GPS data or comparable speed data directly via an interface with the vehicles. The combination of speed measurement values determined in this way and measurement values of the speed-measurement sensors in a variant of the device presented is particularly advantageous. Such an embodiment of the approach presented here also offers the advantage of a very precise ascertainment of the speed of the following vehicle and of the guide vehicle, which in turn opens up the highly precise ascertainment of the following distance between the following vehicle and the guide vehicle, making it possible to further optimize with regard to standing up in court and to expert opinions.

According to a further embodiment, during the step of deducing, the following distance can be deduced by using a difference between the identified speed of the guide vehicle and the identified speed of the following vehicle. Such an embodiment offers the advantage of enabling a very accurate determination of the following distance between the following vehicle and the guide vehicle by means of the very precisely detectable speeds of the following vehicle and of the guide vehicle.

Also advantageous is an embodiment of the approach presented here in which a step of reading an image sequence of chronologically successive images of the following vehicle and of the guide vehicle is provided, wherein the images were recorded by an image sensor in the detection region, wherein in the step of deducing, the following distance is deduced by using the images in the image sequence and/or wherein in the step of detecting, at least one image in the image sequence is stored in order to document the traffic law violation. In the present case, an image sequence can be understood to mean a plurality of images which were recorded by an image sensor at different points in time. An image sensor can be understood to mean, for example, an optical sensor, such as a camera. The method presented here can especially be applied by using the (first or even a second) image sensor in the form of a stereo image sensor. Alternatively, it is also possible to read only images from a mono camera as image sensor. Such an embodiment of the approach presented here offers the advantage that, by evaluating the images in the image sequence, a further independent possibility of deducing the distance between the guide vehicle and the following vehicle is possible so that the reliability and/or precision of the deduced following distance can be increased. Alternatively or additionally, the traffic law violation can also be documented such that it will easily stand up in court or to expert opinions if the recorded or read images of the following vehicle are stored in order to document the traffic law violation.

An embodiment in which the steps of reading and identifying are carried out before the step of capturing and/or ascertaining is particularly advantageous. Such an embodiment offers the advantage that vehicles in approaching traffic can be captured so that, for example, data to show drivers of vehicles do not need to be stored for an excessively long time, whereby a data protection problem can be defused.

Alternatively, the steps of reading and identifying may be carried out after the step of capturing and/or ascertaining. Such an embodiment also allows the advantages of the approach presented here to still be implemented in a simple and reliable manner.

An embodiment of the approach presented here is also conceivable in which in the step of capturing and/or ascertaining, a reference speed of the following vehicle and/or of the guide vehicle is also captured, wherein in the step of deducing, the following distance between the following vehicle and the guide vehicle and/or the captured reference distance is deduced by using the reference speed of the following vehicle and/or by using the reference speed of the guide vehicle. By using the reference speed of the following vehicle and/or of the guide vehicle, such an embodiment offers a further possibility of plausibility-checking and/or calibrating the identified speeds of the following vehicle and/or of the guide vehicle, thereby yielding a further improvement in the deployability of the approach presented here in relation to standing up in court or to expert opinions.

In order to be able to ascertain the traffic law violation in a particularly reliable manner, detection of the traffic law violation can be based on the ascertainment of several following distances within the detection region. For this purpose, according to one embodiment of the approach presented here, in the step of deducing, several following distances between the following vehicle and the guide vehicle at different positions in the detection region can be deduced, in each case by using the identified speeds of the following vehicle and of the guide vehicle at the relevant positions as well as by using the captured and/or ascertained reference distance. In particular, the identified speeds of the following vehicle and of the guide vehicle at the relevant positions can be determined simultaneously. In the step of detecting, the traffic law violation can be detected if the following distances between the following vehicle and the guide vehicle at the different positions in the detection region in each case fall short of the distance threshold, wherein the positions are in particular located within a predefined measurement section in the detection region that is longer than a minimum measurement section.

Technically simple and at the same time very reliable is an embodiment of the approach presented here, in which in the step of detecting, the reference distance is also carried out by using a sensor, by means of whose measurement values the speeds were identified and/or from which the images of the image sequence were read. In this way, the available sensors can be used efficiently in order to detect the traffic law violation. Alternatively, in the step of capturing, the reference distance can also be acquired by using a sensor whose measuring principle differs from a sensor by means of whose measurement values the speeds were identified and/or from which the images in the image sequence were read. In this way, by using sensors for different physical measuring methods, a very accurate determination of the following distance can be realized since, for example, the strengths of the different measuring methods can be used in the respective operational environment.

According to a further embodiment of the approach presented here, in the step of identifying, a type of the following vehicle and/or of the guide vehicle can also be identified, wherein in the step of detecting, a distance threshold depending on the identified type of the following vehicle and/or of the guide vehicle is selected. A type of the following vehicle and/or of the guide vehicle can be understood, for example, to mean that the vehicle class of the vehicle is identified to be a passenger car, a truck, a bus, or the like. Such an embodiment of the approach proposed here offers the advantage of being able to automatically adjust the method proposed here to the different legally prescribed distances in order to thereby be able to react very flexibly to the current traffic situation.

Technically easy to implement and easy to operate in terms of personnel is one embodiment of the approach presented here, in which the steps of identifying and of capturing are each carried out by using a sensor, which have the same geographical position within a tolerance range and which are in particular arranged in a common monitoring unit. For example, the method presented here can be carried out in a locally fixed control tower at the edge of the roadway so that no spatially distributed components need to be used, which would entail data protection problems on the one hand and an increase in equipment installation on the other. Power would only need to be provided at one point.

A following distance can be ascertained particularly accurately when the underlying variables were also ascertained precisely. The following distance can especially be ascertained very precisely if the reference distance is available or ascertained very precisely. For this reason, an embodiment of the approach presented here is advantageous, in which, in the step of capturing, the reference distance is acquired at a reference measurement point that is within a tolerance range closer to a sensor for capturing the images or the speeds than one or more positions in the detection region. In the case of a very small distance from the sensor that captures the reference distance (for example, as compared to a sensor that measures the speeds of the following vehicle and/or of the guide vehicle within the detection region), such a determination of the reference distance therefore usually has a very high precision, which then also leads to very precise results for the following distance.

It is also conceivable not only to detect the traffic law violation on the basis of vehicles in approaching traffic but also on the basis of vehicles in departing traffic. For this reason, according to a further embodiment, in the step of identifying, at least one respective speed of the following vehicle and of the guide vehicle can be identified in a second detection region different from the detection region in the surroundings of the sensor, wherein measurement values for identifying the speed of the following vehicle and of the guide vehicle are in particular acquired simultaneously in the second detection region. In the step of deducing, at least a second following distance between the following vehicle and the guide vehicle in the second detection region can be deduced by using the identified speeds of the following vehicle and of the guide vehicle in the second detection region, and it can be detected in the step of detecting the traffic law violation if the following distance in the detection region and the second following distance in the second detection region in each case fall short of the distance threshold. The second detection region can, for example, lie on a side opposite the detection region or in an opposite viewing direction of a sensor that supplies the measurement values from the first detection region. The second detection region can thus, for example, contain vehicles in departing traffic, whereas vehicles in the detection region contain vehicles that are driving toward a sensor that supplies measurement values for executing the approach presented here.

An embodiment of the approach proposed here is advantageous, in which, in the step of reading, the first and/or the second image sequence is read from an optical sensor as the first and/or the second image sensor. Such an embodiment of the approach proposed here enables the use of technically simple and inexpensively available optical sensors in order to nevertheless be able to ascertain the distance both reliably and such that it will stand up in court, especially to be able to identify a driver of the following vehicle.

According to a further embodiment of the approach proposed here, in the step of identifying, measurement or laser or radar signals that were reflected by the following vehicle and/or the guide vehicle can also be evaluated, and wherein, in the step of deducing, the following distance is furthermore ascertained by using the measurement or laser or radar signals or information from one or more of these measurement or laser or radar signals. Such an embodiment of the approach proposed here offers the advantage of being able to carry out a very accurate determination of the deduced following distance by using the measurement or laser or radar signals or the information therefrom, in particular since evaluation of the corresponding measurement or laser or radar signals is carried out on the basis of a different physical measured variable than the evaluation of images, so that errors occurring during the detection of the distance can possibly be detected or corrected by the evaluation of images. For example, the measurement or laser or radar signals can be used in such a way that speeds of the following vehicle and of the guide vehicle are determined, for example by means of the Doppler effect, and an ascertainment of the distance between the following vehicle and the guide vehicle can be calculated therefrom. A distance of the guide vehicle from the corresponding sensor can also be detected on the one hand and a distance of the following vehicle from the corresponding sensor can also be detected on the other hand so that a difference between the guide vehicle and the following vehicle can also be ascertained from a difference between the two detected distances. Such a following distance can then still be encumbered with measurement uncertainties, which can however be significantly reduced by the calibration by the reference distance, and the following distance can thus be determined such that it will stand up in court and to expert opinions.

According to a further embodiment of the approach presented here, a distance threshold that is dependent on a speed of the following vehicle and/or of the guide vehicle can be used in the step of detecting. In this case, for example, the speed of the guide vehicle and/or of the following vehicle can be ascertained from the first and/or second images and/or by using a measurement or laser or radar signal. Such an embodiment offers the advantage of being able to adjust the detection of the traffic law violation precisely to what are often legal requirements regarding the allowable distance at specific driving speeds of the following vehicle or guide vehicle.

Also advantageous is an embodiment of the approach proposed here in which, in the step of reading, a first and/or a second image sequence is read which illustrates a route of the following vehicle and of the guide vehicle that has a predefined minimum length. In this case, in the step of ascertaining, the distance between the following vehicle and the guide vehicle can be ascertained by using several first and/or second images (for example, a first and a second image at the beginning and a first and a second image at the end of the minimum length), and in the step of detecting, the traffic law violation is then detected if the ascertained distance falls short of the distance threshold even over the predefined minimum length. Such an embodiment of the approach proposed here offers the advantage of being able to monitor the distance of the following vehicle from the guide vehicle over a longer period of time or a longer route so that a short-term fall below the allowable distance, such as occurs when a vehicle cuts in in front of the following vehicle, can be recognized.

An embodiment that is particularly convenient for the user of a variant of the approach proposed here is one in which, in the step of detecting, a registration number of the following vehicle is also recognized and/or one of the images in the image sequence is stored if a traffic law violation is detected. Such an embodiment offers the advantage that the images used for detecting the undershooting of the allowable distance can be used directly for a further benefit, namely on the one hand to document which driver was driving the following vehicle and on the other hand (for example, automatically) to be able to certify or evaluate a vehicle number plate as the registration number of the following vehicle.

An embodiment of the approach proposed here is also particularly favorable, in which, in the step of ascertaining, a speed of the guide vehicle and/or of the following vehicle is ascertained by using the image sequence and/or the second image sequence and/or by using a measurement, laser, and/or radar signal, and wherein in the step of detecting, a traffic law violation is also detected if the speed of the guide vehicle and/or of the following vehicle is greater than a speed threshold. Such an embodiment of the approach proposed here offers the advantage of not only being able to monitor the undershooting of an allowable distance between the vehicle and the guide vehicle but also at the same time making possible a monitoring of compliance with a possibly locally specified maximum speed. In this way, a single monitoring unit can be used to ascertain or document several different traffic law violations.

In order to increase current traffic safety, even in the event of a traffic law violation, a step of outputting a warning message can also be provided in one embodiment of the approach proposed here if the traffic law violation was detected in the step of detecting. Such a warning message can, for example, be displayed on a display outside the guide vehicle and/or following vehicle, for example on a display which is structurally integrated on or within a housing together with the first and/or the second image sensor. An embodiment is also conceivable in which the warning message is output or displayed, for example, to an occupant of the guide vehicle and/or of the following vehicle.

An embodiment of the method presented here can be implemented, for example, in software or hardware or in a mixed form made up of software and hardware, for example, in a control unit.

The approach presented here also creates a device that is designed to carry out, control, or implement the steps in corresponding devices in a variant of a method presented here. The object on which the invention is based can also be achieved quickly and efficiently by means of this embodiment variant of the invention in the form of a device.

For this purpose, the device can have at least one computing unit for processing signals or data, at least one storage unit for storing signals or data, at least one interface to a sensor or an actuator for reading sensor signals from the sensor or for outputting data or control signals to the actuator, and/or at least one communication interface for reading or outputting data that are embedded in a communication protocol. The computing unit can, for example, be a signal processor, a microcontroller, or the like, wherein the memory unit can be a flash memory, an EEPROM, or a magnetic memory unit. The communication interface can be designed to read or output data wirelessly and/or in a line-bound manner, wherein a communication interface that can read or output line-bound data can, for example, read these data electrically or optically from a corresponding data transmission line or output them into a corresponding data transmission line.

In the present case, a device can be understood to mean an electrical device that processes sensor signals and as a function thereof outputs control and/or data signals. The device may have an interface, which may be designed as hardware and/or software. In a hardware design, the interfaces can, for example, be part of what is known as a system ASIC, which includes a wide variety of the functions of the device. However, it is also possible that the interfaces are separate integrated circuits or consist at least in part of discrete components. In a software design, the interfaces may be software modules which, for example, are present on a microcontroller in addition to other software modules.

Also advantageous is a computer program product or computer program with program code which can be stored on a machine-readable carrier or storage medium, such as a semiconductor memory, a hard disk memory, or an optical memory, and is used to carry out, implement, and/or control the steps of the method according to one of the embodiments described above, in particular if the program product or program is executed on a computer or a device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

In the following description of advantageous exemplary embodiments of the present invention, identical or similar reference signs are used for the elements illustrated in various figures and having a similar effect, a repeated description of these elements being dispensed with.

DETAILED DESCRIPTION

Figure 1:
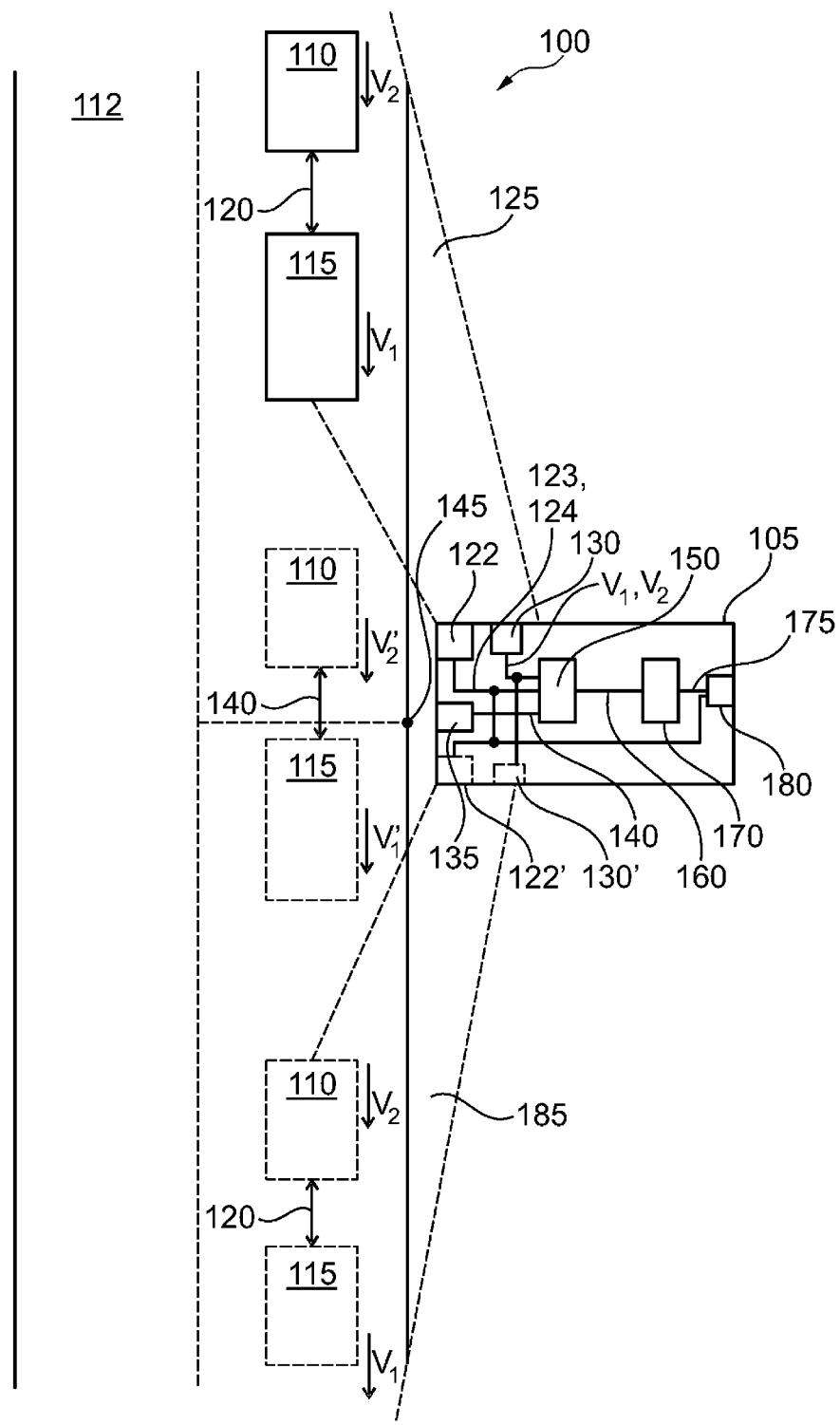
FIG. 1 a schematic representation of a traffic scenario for detecting a traffic law violation by using a device according to an exemplary embodiment.

FIG. 1 shows a schematic representation of a traffic scenario 100 for detecting a traffic law violation by using a device 105 according to an exemplary embodiment of the approach presented here. In this traffic scenario 100, on a schematically illustrated freeway section 112, a following vehicle 110 is traveling very closely behind a guide vehicle 115 with the result that a distance 120 falls short of a legally prescribed distance threshold, which represents a traffic law violation. In order to be able to take action regarding this traffic law violation in a manner that will stand up in court, the aforementioned device 105 is now used in accordance with an exemplary embodiment of the approach proposed here.

In the device 105, an image sequence 123 of chronologically successive images 124 of the following vehicle 110 and of the guide vehicle 115 is first, for example, recorded by a camera as an image sensor 122, wherein the following vehicle 110 and the guide vehicle 115 are moving within a detection region 125 of the image sensor 122. The image sensor 122 can in this case be an optical image sensor, such as the aforementioned camera. In this way, the recording of the travel of the following vehicle 110 at the corresponding distance 120 behind the guide vehicle 115 can be stored for later documentation purposes. Since the distance 120 between the guide vehicle 115 and the following vehicle 110 at a greater distance of the location of the device 105 from the following vehicle 110 and/or from the guide vehicle 115 is now in some cases only to be determined quite inaccurately and thus may not be ascertained sufficiently precisely to stand up in court, an identification unit 130 is now provided in the device 105 in accordance with the approach presented here in order to ascertain (as simultaneously as possible) a speed $v_1$ of the guide vehicle 115 and a speed $v_2$ of the following vehicle 110. For example, the speeds $v_1$ and $v_2$ can be identified by using a radar sensor and/or a LIDAR sensor in the identification unit 130, which offers very high precision in ascertaining a speed of a vehicle even at greater distances of the corresponding vehicle. This is based, for example, on the effect of a different measuring principle of the speed by such sensors as compared with ascertainment of the speed from images 123 of optical sensors, such as a camera serving as the image sensor 122. Radar sensors can, for example, evaluate a Doppler effect in order to capture the speed $v_1$ of the guide vehicle 115 or the speed $v_2$ of the following vehicle 110. In the case of a LIDAR sensor being used in the identification unit 130, by means of very closely successive distance measurements of the distance of the guide vehicle 115 and/or of the distance of the following vehicle 110, it is possible to deduce respectively the speed $v_1$ of the guide vehicle 115 and the speed $v_2$ of the second following vehicle in relation to the location of the device 105 or of the image sensor of the identification unit 130.

Although the distance 120 between the guide vehicle 115 and the following vehicle 110 could already be ascertained by evaluating the signal propagation times or the speeds $v_1$ and $v_2$ when tracking the guide vehicle 115 and the following vehicle 110 in the detection region 125, such a measurement might still not be precise enough to be used for a prosecution of the traffic law violation that stands up in court. For this reason, according to an exemplary embodiment of the approach proposed here, an acquisition unit 135 is used that captures a reference distance 140 between the guide vehicle 115 and a reference point 145 in the following vehicle 110. This reference point 145 can, for example, be outside the detection region 125 and be arranged significantly closer to a position at which the speed $v_1$ of the guide vehicle 115 and the speed $v_2$ of the following vehicle 110 in the detection region 120 are identified by the identification unit 130. For example, the acquisition unit 135 can capture the reference distance 140 at a reference point 145 which, within a tolerance range of, for example, ten percent, is at the smallest distance from a location of the device 105 or of the acquisition unit 135. In this case, the acquisition unit 135 can also be based on measurement values of the measured-value sensors that supply measurement values for the identification unit 130, i.e., for example, can be based on radar measurements that also supply the speeds $v_1$ and $v_2$ of the vehicles within the detection region 125, whereby expenditure can be reduced due to the multiple utilization of available sensors. However, it is also conceivable for the acquisition unit to use measurement values for the reference distance, which are based on a different physical detection principle for capturing the reference distance 140 than, for example, a measuring principle on which the identification unit 130 is based. For example, the acquisition unit 135 can be based on light barrier technology. Alternatively or additionally, however, a LIDAR-based measurement of the reference distance 140 between the guide vehicle 115 and the following vehicle 110 can also be carried out, for example. The acquisition unit 135 then outputs a signal corresponding to the reference distance 140 to a deduction unit 150. In the deduction unit 150, parameters are also read from the identification unit 130, which parameters correspond to the speed $v_1$ and the speed $v_2$, wherein the images 123 in the image sequence 124 are also still read from the image sensor 122 in the deduction unit 150.

In the deduction unit 150, by using the reference distance 140 and the speeds $v_1$ and $v_2$, a following distance 160 between the following vehicle 110 and the guide vehicle 150 is then deduced from the parameters already available, which distance corresponds with high precision to the distance 120 in the detection region 125. This is based on the fact that the speeds $v_1$ and $v_2$, which may not have been captured precisely enough, can now be calibrated by using the reference distance 140, and a detection of a traffic law violation that will stand up in court is thus possible in a detection unit 170 when the following distance 160 in the detection region 125 falls short of a predetermined distance threshold $D_{min}$. In this case, a corresponding signal 175 can be output, by means of which a corresponding documentation unit 180 documents the traffic law violation of the following vehicle 110 by the insufficient distance 120 between the following vehicle 110 and the guide vehicle 115. For this purpose, for example, a corresponding image 123 from the image sequence 124 can in turn be used, in which the driver is, for example, shown for documentation purposes and/or by which a number plate of the following vehicle 110 can be automatically recognized.

A vehicle-type-dependent distance threshold and/or a speed-dependent distance threshold can also be used to detect the traffic law violation. This can be due, for example, to the fact that larger vehicles, such as trucks, for example hazardous goods transporters, may need to maintain a greater distance from a vehicle ahead according to traffic law provisions than do smaller vehicles, such as cars. Alternatively or additionally, according to traffic law provisions, at high driving speeds of the vehicles, a greater safety distance from a vehicle ahead may also have to be maintained than at lower driving speeds. For this reason, the type of the following vehicle can be identified, for example, by evaluating data from the image sensor 122, and on this basis, the distance threshold $D_{min}$ can be specified. Alternatively or additionally, at least one of the speeds identified by the identification unit 130 can also be used to specify the distance threshold $D_{min}$.

In the deduction of the following distance, the speed $v_1$ of the guide vehicle 115 can here be set in relation to that of the speed $v_2$ of the following vehicle 110 in order to ascertain whether the distance 120 between the guide vehicle 115 and the following vehicle 120 within the detection region 125 has become smaller or larger at the respective points in time of identifying the speeds or in relation to the time of acquisition of the reference distance 140.

It is also conceivable for the corresponding speeds $v_1$ of the guide vehicle 115 and $v_2$ of the following vehicle 110 to be ascertained from the images 123 in the image sequence 124 and to be used for deducing the following distance 160 in addition to or as an alternative to the speeds $v_1$ and $v_2$ ascertained by the identification unit 130.

According to a further exemplary embodiment, not only can the reference distance 140 between the guide vehicle 115 and the following vehicle 110 also be ascertained in the acquisition unit 135, but also, for example, the speed as the reference speed of the guide vehicle 115 in the area of the reference point 145 and/or the speed as the reference speed $v_2'$ of the following vehicle 110 in the area of the reference point 145. In this way, an improved calibration of the speeds $v_1$ and $v_2$ captured by the identification unit 130 in the detection region 125 can advantageously be realized again, whereby an improvement in the precision of the deduced following distance 160 can be realized again in the deduction unit 150 by taking into account these reference speeds and $v_2'$ captured by the acquisition unit 135.

In order to be able to comply with legal requirements according to which the distance 120 must fall below the distance threshold over a specific minimum length, the corresponding speeds $v_1$ of the guide vehicle 115 and $v_2$ of the following vehicle 110 can also be identified in the detection region 125 at different positions (as simultaneously as possible) in order to then deduce the distance 120 in the detection region 125 together with the reference distance 140 to each of the positions at which the respective speeds $v_1$ and $v_2$ were recorded or identified.

An exemplary embodiment of the device 105 is also conceivable in which a further image sensor 122' is provided, which can record or track the guide vehicle 115 and the following vehicle 110 within a second detection region 185 and provides the deduction unit 160 with corresponding images 123 in an image sequence 124. The further image sensor 122' can be used, for example, in addition to or as an alternative to the image sensor 122. A further identification unit 130' can also be provided which identifies the speed $v_1$ of the guide vehicle 115 and the speed $v_2$ of the following vehicle 110 within the second detection region 185 and transmits them to the deduction unit 160. In the deduction unit 160, the following distance 160 can be ascertained, for example, by using the reference distance 140 and the images 123 in the image sequence 124 made available by the further image sensor 122' and/or by using the speeds $v_1$ and $v_2$ of the further identification unit 130', and in the event of the following distance 160 falling short of a distance threshold $D_{min}$, the traffic law violation can be detected in the detection unit 170.

In this way, it is possible to monitor not only vehicles in traffic in the detection region 125 approaching the device 105 or the image sensor 122 or the identification unit 130 but also to be able to monitor vehicles of departing traffic in the second detection region 185. However, it is also conceivable for not only vehicles in the detection region 125 but also vehicles in the second detection region 185 to be monitored, for example for a significantly longer monitoring section to be implemented by the device 105. In this case, for example, in order to not have to use separate image sensors, such as the image sensor 122 and the further image sensor 122', a single image sensor can also be used and equipped with a corresponding wide-angle optical system (fish-eye lens), whereby cost savings can be realized by dispensing with additional sensors.

In order to enable a particularly low-staff mode of operation or a compact design of the device 105, this device 105 can be constructed in such a way that at least two units of the group consisting of image sensor 122, identification unit 130, deduction unit 150, detection unit 170, documentation unit 180, further image sensor 122', and/or further identification unit 130' are arranged in a common housing and/or at a common location in the area next to a roadway, such as the freeway 112. In this way, the traffic flow on the roadway, such as the freeway 112, can be monitored technically very easily and corresponding traffic law violations can be documented in a manner that will stand up in court and/or to expert opinions.

In summary, it should be noted that in one exemplary embodiment of the approach presented here, optional use of radar (for merging with, for example, a stereo video sensor) is proposed. In this way, with modern tracking methods, the possibility emerges of observing and tracking objects, including their driving behavior, over a long observation period in addition to their position, speed, and vehicle class. This information can, for example, be embedded in a video image and time-stamped. However, approaches according to the prior art fail to recognize that neither radar/laser nor superposition with stereo video can reliably determine distances between two vehicles in a manner that will stand up in court when the measurements are to be taken at great distances (approximately 100-250 m). This is due, among other things, to the fact that vehicle lengths can only be "estimated" at this distance. The mention of the "average speed" in solutions known in the prior art relates to additional possibilities for prosecuting speeding violations but not distance violations. The approach presented here is intended to remedy this.

A solution presented here for "unattended measuring operation" will even in the future be difficult to implement in many countries by using radar alone. A sensor merging of radar/LIDAR into a video sensor (e.g., stereo video) is advantageous here, in particular when providing evidence in court.

In one exemplary embodiment, for reasons of simplicity, a video sensor can be used for documenting tailgating offenses. This or at least one further sensor should carry out a reference measurement, if possible in an area close to the sensor, e.g., perpendicularly to the roadway 112; however, even at any other angle to the roadway, such a measurement of the reference distance is possible, which documents at least a temporary reference distance. This measurement is to be carried out at a reference section point. Only with regard to this reference length measurement (or point measurements with time stamp and video documentation) should a tracking method by means of, for example, radar (possibly every 100 m) or laser (more precise and usable for 250 m) be installed downstream or upstream while taking into account the reference measurement. When upstream of the reference measurement, only the absolute speeds of the two (or more) vehicles are initially determined in the tracking method. Only when the reference measurement is carried out at the reference section point, their actual distances can be calculated in retrospect on the basis of the speed differences. In addition, the vehicles can be classified here. When downstream of the reference measurement at the reference section point, the distances of the two vehicles can be calculated directly in the tracking method via the respective speed differences over the section of, for example, approximately 100 or 250 m, while taking into account the reference distance. The reference distance between the vehicles can preferably be ascertained/calculated via a distance measurement between sensor and vehicle 1 and sensor to vehicle 2 (following vehicle). Here, the measurement can be carried out, for example, by the same sensor which tracks the speeds for further distances. This means that a radar sensor could ascertain a measurement of the distance 140 at the reference section point at optimal resolution and optimal "visibility conditions" due to an optimal distance of the vehicles from the sensor, and then use this reference distance 140 for ascertaining the individual distances 120 for further distances.

The illustration in FIG. 1 can be summarized again as follows. The following vehicle 110 follows the guide vehicle 115 in a lane of the roadway 112. At the reference section point 145, a distance measurement is carried out at the point in time $t_R$ and, if the distance falls short of a minimum distance $D_{min}$ as the distance threshold, a photograph or image of the driver of the following vehicle 115 is taken or an existing image is saved, including, for example, one of a number plate automatically recorded using an ANPR method (ANPR=automatic number plate recognition). Optionally before or after the reference measurement, for example, a video-superposed tracking method takes place by means of, for example, a LIDAR/radar sensor. In the tracking method, not the distances but only the absolute speeds of the vehicles 115 and 110 are measured/ascertained. They are logged and at the point in time of the reference measurement, a distance 120 is assigned to the respective speed differences. If this distance is, for example, over 250 m less than the distance threshold $D_{min}$ at all times of the measurement section, for example, the violation is assessed as a tailgating violation or traffic law violation. Otherwise, the measurement is discarded and all data deleted immediately. In the event that the tracking method is downstream of the reference section measurement (reference section point), calculation of the distances can be made directly from the absolute speeds while taking into account the reference distance 140. Encryption of the data can optionally be carried out, especially in order to comply with data protection rules. Particularly preferred is a one-pole solution with a tracking method before and after the reference measurement by a single control column or the device 105 with the radar/LIDAR sensors for supplying the data to the identification unit 130 or 130' and cameras as the image sensor 122 or the further image sensor 122', possibly lighting units or with an optional 360° camera (fish-eye).

If the deduction unit 160 of the device 105 detects for example at a point in time $t_1$ that the following vehicle 110 is traveling at 51 kph but the guide vehicle 115 is traveling only at 50 kph and, for further subsequent points in time $t_2$ to $t_R$, such speed pairs are also formed in which the speed of the following vehicle 110 is greater than that of the guide vehicle 115, it can be deduced that the distance 120 between the following vehicle 110 and the guide vehicle 115 is decreasing. A video superposition of the images 123 of the image sensor 122 is recommended here for documentation and possibly as "second evidence." At the point in time $t_R$, a distance measurement takes place; in this case, the reference distance 140 $D_R$ is determined. For example, 50 m is specified as the distance threshold $D_{min}$. In this example, the reference distance 140 $D_R$ is 25 m. Now, for example, a calculation in retrospect is made for all value pairs of the speed values that were previously captured when the two vehicles 110 and 115 were tracked. Without calculation, in the case of downstream tracking, it would be apparent that the reference distance 140 $D_R$ did not decrease for the absolute speeds mentioned. A continuous undershooting of the minimum distance over the measurement section of 250 m would thus also be demonstrable. In addition, measurement inaccuracies with respect to the vehicle length can be added automatically to the measured distance so that, in the event of court proceedings, there is no need for discussion about reflections to the detriment of the offending vehicle.

In summary, it should be noted that the high requirements for proof that will stand up in court (such as in Germany) for automated so-called unattended measuring operation are often not satisfied in conventional systems. Another aspect of case law in some regions (for example, in Germany) requires evidence of the distance violation, particularly on freeways and expressways, over a certain distance (at least 250 m to 300 m) since the penalty notices/criminal proceedings would otherwise result in successful appeal proceedings. The reason is genuine or alleged short-term undershooting of the required safety distance. Such undershooting is allowed because a braking maneuver of the vehicle ahead or a vehicle cutting in from the adjacent lane can cause a short-term reduction in the prescribed safety distance. For this reason, devices of some types are not approvable or are approved only when a measuring officer assesses each measurement and approves it for the subsequent penalty/criminal proceedings. Moreover, no device so far has provided automatic documentation for identifying the driver ("driver photo"). Another difficulty of known systems lies in the shape of vehicles that are driving too closely, for example in the case of a truck that is driving closely in the right-hand lane. In a bridge measuring method, the number plates cannot be detected and recognized by the measuring system simultaneously with the distance measurement because in the case of high vehicles driving very closely, visibility of the number plates is not given. This rules out automated number plate recognition by means of ANPR and comparison with an owner database. In some known measuring methods, sensors must be incorporated into the roadway and bridges are absolutely necessary and/or markings must be applied to the roadway. This means that distance measurement is only possible at previously defined locations and that the road must be closed at this location during commissioning and maintenance.

In what is known as unattended measuring operation. i.e., without the presence of a measuring officer, the approach presented here should be able to automatically measure, to document in a manner that will stand up in court, and to evaluate in an automated manner distance violations between vehicles traveling too closely, to also provide a driver photo for countries with driver liability, and/or perform a whitelist comparison with an owner database so that an automated issuing of traffic tickets can also take place. This minimizes the resources required for measuring staff on site and in the back office.

An important part of the approach presented here is the automated establishment of distance limits, which in some countries (for example, Germany) involves differentiating the type of vehicle. Different distance regulations respectively apply to buses, trucks, and cars. For this purpose, the approach presented here offers the possibility of being able to carry out the necessary classification of the vehicles. In addition, the approach presented here makes it possible to calculate the minimum distance to be maintained, in most cases as a function of vehicle speed, in order to assess the severity of the violation. The approach presented here offers the possibility of an automated measurement, for example, by the transition from one or two point measurements to a linear video or speed-tracking function: This ensures that the violation can be substantiated over a section of, for example, at least 250 m to 300 m. The described solution can be constructed on a modular basis, in terms of both hardware and software/algorithms, in three scenarios as a mobile device (tripod/battery operation) or a permanently installed stationary system (tower/permanently installed housing):

a. on one side of a freeway/expressway, at parking bays, parking lot exits/entrances for monitoring/writing up tailgating trucks with ANPR and whitelist/blacklist comparison;

b. installation on bridges as a mobile and/or a permanent installation with ANPR and optionally driver photos as documentation that will stand up in court;

c. on the left-hand side of a motorway/expressway (median) on the guardrail as a mobile system (tripod) or as a permanently installed stationary tower for monitoring/writing up fast-moving cars ("speeders," "bumper chasers") and ANPR and blacklist/whitelist comparison as well as driver photo;

d. installation in "moving operation," i.e., in monitoring vehicles or, for example, in drones.

For example, a stereoscopic arrangement in combination with radar (optional) is used to capture objects at greater distances. In addition to the position, the speed, and the vehicle class, modern tracking methods make it possible to observe and track the objects, including their driving behavior, over a long observation period. This information is, for example, embedded in a video image and time-stamped. If, during this observation period, the following driver now continuously falls short of the minimum distance to the driver ahead, the distance violation is provable. For this purpose, a measurement of a reference distance can be used in order to calibrate the distances of the two monitored vehicles within the detection region. As the following driver now approaches the measuring system node, it is also possible at a suitable distance to read the number plate and acquire a driver image. It is also conceivable for at least one second system to be set up with a similar structure, which also collects the information and forwards this information to the first system in order to carry out evidence collection over a larger range, for example 250 m, in a precise and networked manner.

The aforementioned embedding into the video image can be represented, for example, by color highlighting, label boxes with number plates that "travel along" with the offending vehicle, or the aforementioned marking types. The approaches proposed by way of example can also be easily coupled with other systems in the traffic safety field. Examples include average speed recording, blacklist/whitelist comparison. Transmission of information to other warning systems or displays is also conceivable (e.g., warning systems with a text message ("Warning: You are driving too close!")).

Figure 2:
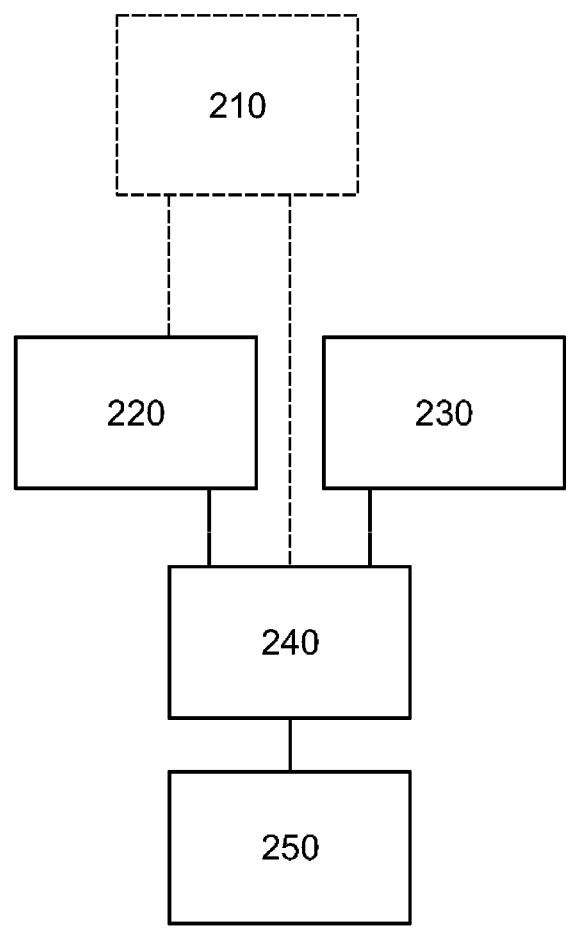
FIG. 2 a flow chart of a method according to an exemplary embodiment.

FIG. 2 shows a flow chart of a method 200 for detecting a traffic law violation due to an allowable distance between a following vehicle and a guide vehicle being undershot, wherein the following vehicle travels behind the guide vehicle according to an exemplary embodiment. The method 200 comprises a step 210 of reading an image sequence of chronologically successive images of the following vehicle and of the guide vehicle, wherein the images were recorded by an image sensor in a detection region in the surroundings of the image sensor. The method 200 furthermore comprises a step 220 of identifying at least one respective speed of the following vehicle and of the guide vehicle in a detection region in the surroundings of a sensor providing speed measurement values, wherein measurement values for identifying the speed of the following vehicle and of the guide vehicle within the detection region are in particular captured simultaneously. The method 200 also comprises a step 230 of capturing a reference distance between the following vehicle and the guide vehicle at a reference measurement point. The method 200 furthermore comprises a step 240 of deducing at least one following distance between the following vehicle and the guide vehicle within the detection region by using the identified speeds of the following vehicle and of the guide vehicle as well as the captured reference distance. Lastly, the method 200 comprises a step 250 of detecting the traffic law violation when the following distance within the detection region falls short of a distance threshold.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting a traffic law violation due to an allowable distance between a following vehicle and a guide vehicle being undershot, wherein the following vehicle travels behind the guide vehicle and wherein the method has the following steps:

identifying at least one respective speed of the following vehicle and of the guide vehicle in a detection region in the surroundings of a sensor supplying speed measurement values, wherein measurement values for identifying the speed of the following vehicle and of the guide vehicle are in particular captured simultaneously in the detection region;

capturing and/or ascertaining a reference distance between the following vehicle and the guide vehicle at a reference measurement point;

determining at least one following distance between the following vehicle and the guide vehicle in the detection region by using retrospect measurements of the identified speeds at a first point of time and at least one subsequent point of time of the following vehicle and of the guide vehicle and/or by using the captured reference distance; and detecting the traffic law violation if the following distance in the detection region continuously falls short of a distance threshold.

2. The method according to claim 1, wherein in the step of identifying, the speed of the following vehicle and of the guide vehicle determined in the detection region by using measurement values of a speed-detection sensor, in particular, of a radar sensor and/or of a LIDAR sensor, and/or directly from reading speed-relevant data transmitted from the vehicle and/or by using images in an image sequence from an image sensor.

3. The method according to claim 1, wherein in the step of determining, the following distance is deduced by using a difference between the identified speed of the guide vehicle and the identified speed of the following vehicle.

4. The method according to claim 1, wherein by a step of reading an image sequence of chronologically successive images of the following vehicle and of the guide vehicle, wherein the images were recorded by an image sensor from the detection region, wherein in the step of determining, the following distance is deduced by using the images in the image sequence and/or wherein in the step of detecting, at least one image in the image sequence is at least partially stored in order to document the traffic law violation.

5. The method according to claim 1, wherein the step of reading and/or of identifying is carried out before the step of capturing and/or ascertaining, or that the step of reading and/or identifying is carried out after the step of capturing and/or ascertaining.

6. The method according to claim 1 wherein in the step of capturing and/or ascertaining, a reference speed of the following vehicle and/or of the guide vehicle is furthermore captured, wherein in the step of determining the following distance between the following vehicle and the guide vehicle is deduced by using the reference speed of the following vehicle and/or by using the reference speed of the guide vehicle and/or the captured reference distance.

7. The method according to claim 1, wherein in the step of determining, several following distances between the following vehicle and the guide vehicle at different positions in the detection region are deduced in each case by using the identified speeds of the following vehicle and of the guide vehicle at the relevant positions as well as the captured and/or ascertained reference distance, wherein the identified speeds of the following vehicle and of the guide vehicle at the relevant positions are determined simultaneously, and wherein in the step of detecting, the traffic law violation is detected if the following distances between the following vehicle and the guide vehicle at the different positions in the detection region in each case fall short of the distance threshold, wherein the positions are in particular located within a predefined measurement section in the detection region that is longer than a minimum measurement section.

8. The method according to claim 1 wherein in the step of capturing, the reference distance is also captured by using a sensor by means of whose measurement values the speeds were identified and/or from which the images in the image sequence were read, or in that in the step of capturing, the reference distance is acquired by using a sensor whose measuring principle differs from a sensor by means of whose measurement values the speeds were identified and/or from which the images in the sequence of images were read.

9. The method according to claim 1, wherein in the step of identifying, a type of the following vehicle and/or of the guide vehicle is identified, wherein in the step of detecting, a distance threshold dependent on the identified type of the following vehicle and/or of the guide vehicle is selected.

10. The method according to claim 1, wherein the steps of identifying and/or capturing are in each case carried out by using a sensor which have an identical geographical position within a tolerance range and which are in particular arranged in a shared monitoring unit.

11. The method according to claim 1, wherein in the step of capturing, the reference distance is captured at a reference measurement point which is located within a tolerance range closer to a sensor for capturing the images and/or the speeds than one or more positions in the detection region.

12. The method according to claim 1, wherein in the step of identifying, at least one respective speed of the following vehicle and of the guide vehicle are identified in a second detection region different from the detection region in the surroundings of the sensor, wherein measurement values for identifying the speed of the following vehicle and of the guide vehicle are in particular simultaneously captured in the second detection region, wherein, in the step of determining, at least one second following distance between the following vehicle and the guide vehicle in the second detection region is deduced by using the identified speeds of the following vehicle and of the guide vehicle in the second detection region, and wherein in the step of detecting, the traffic law violation is detected if the following distance in the detection region and the second following distance in the second detection region in each case continuously falls short of the distance threshold.

13. A device having devices which are designed to control, implement, and/or execute the steps of a method according to claim 1.

14. A device for detecting a traffic law violation due to an allowable distance between a following vehicle and a guide vehicle being undershot, the device comprising:
   a memory; and
   one or more processors to execute computer-readable instructions stored in the memory to perform a method comprising the steps of the method according to claim 1.

15. A machine-readable storage medium on which the computer program according to claim 14 is stored.

* * * * *